(12) United States Patent
Liu

(10) Patent No.: US 8,013,666 B1
(45) Date of Patent: Sep. 6, 2011

(54) LOW RIPPLE CHARGE PUMP

(75) Inventor: Ping-Chen Liu, Fremont, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 12/534,066

(22) Filed: Jul. 31, 2009

(51) Int. Cl.
 *G05F 1/10* (2006.01)
(52) U.S. Cl. .......................................... 327/536; 363/60
(58) Field of Classification Search .................. 327/536; 363/59–60
 See application file for complete search history.

(56) References Cited

U.S. PATENT DOCUMENTS

| | | | | |
|---|---|---|---|---|
| 5,216,588 A * | 6/1993 | Bajwa et al. | | 363/60 |
| 5,337,284 A * | 8/1994 | Cordoba et al. | | 365/227 |
| 5,767,735 A * | 6/1998 | Javanifard et al. | | 327/536 |
| 5,969,565 A * | 10/1999 | Naganawa | | 327/536 |
| 6,128,242 A * | 10/2000 | Banba et al. | | 365/226 |
| 6,154,411 A * | 11/2000 | Morishita | | 365/226 |
| 6,297,687 B1 * | 10/2001 | Sugimura | | 327/536 |
| 6,400,210 B2 * | 6/2002 | Myono | | 327/536 |
| 6,414,881 B1 * | 7/2002 | Fujii et al. | | 365/189.09 |
| 6,486,728 B2 * | 11/2002 | Kleveland | | 327/536 |
| 6,492,862 B2 | 12/2002 | Nakahara | | |
| 6,567,309 B2 * | 5/2003 | Tanzawa | | 365/185.18 |
| 6,624,656 B1 * | 9/2003 | Fox et al. | | 326/41 |
| 6,661,683 B2 | 12/2003 | Botker et al. | | |
| 6,765,428 B2 * | 7/2004 | Kim et al. | | 327/534 |
| 6,781,439 B2 * | 8/2004 | Tanzawa et al. | | 327/536 |
| 6,794,923 B2 | 9/2004 | Burt et al. | | |
| 6,831,500 B2 * | 12/2004 | Sato et al. | | 327/536 |
| 6,836,176 B2 | 12/2004 | Zeng et al. | | |
| 7,176,747 B2 * | 2/2007 | Lee et al. | | 327/536 |
| 7,274,248 B2 * | 9/2007 | Okamoto | | 327/536 |
| 7,443,230 B2 * | 10/2008 | Chen et al. | | 327/535 |
| 7,579,902 B2 * | 8/2009 | Frulio et al. | | 327/536 |
| 7,733,162 B2 * | 6/2010 | Kim et al. | | 327/536 |
| 2002/0063594 A1 * | 5/2002 | Lee | | 327/536 |
| 2005/0286310 A1 * | 12/2005 | Roohparvar | | 365/185.28 |
| 2006/0114053 A1 * | 6/2006 | Sohara et al. | | 327/536 |
| 2009/0097285 A1 * | 4/2009 | Cook et al. | | 363/60 |

\* cited by examiner

*Primary Examiner* — Thomas J Hiltunen

(74) *Attorney, Agent, or Firm* — Treyz Law Group; G. Victor Treyz; David C. Kellogg

(57) ABSTRACT

A charge pump circuit may have multiple charge pumps. Each charge pump may have an output. The outputs of the charge pumps may be connected to a common output terminal for the charge pump circuit. The charge pump circuit may produce an output voltage at the output terminal. The output voltage may be monitored by a charge pump regulator circuit. The charge pump regulator circuit may produce a control signal based on the measured output voltage. The control signal may be processed by register and logic gating circuitry and may be used to generate a sequential set of slave charge pump enable signals. The slave charge pump enable signals may be used to sequentially enable the charge pumps to progressively increase the strength of the charge pump while exhibiting reduced ripple.

14 Claims, 6 Drawing Sheets

| CLOCK CYCLE | EN1 | EN2 | EN3 | EN4 | ... | # CP ACTIVE |
|---|---|---|---|---|---|---|
| 1 | 0 | 0 | 0 | 0 | 0 | 1 (MASTER) |
| 2 | 1 | 0 | 0 | 0 | 0 | 2 |
| 3 | 1 | 1 | 0 | 0 | 0 | 3 |
| 4 | 1 | 1 | 1 | 0 | 0 | 4 |
| ⋮ | | | | | | ⋮ |

FIG. 3

LOW RIPPLE CHARGE PUMP

BACKGROUND

This invention relates to integrated circuits, and more particularly, to charge pump circuitry for integrated circuits.

Charge pumps are widely used in integrated circuits. For example, charge pump circuits may be used to generate a negative body bias voltage to apply to the p-wells of n-channel metal-oxide-semiconductor transistors on an integrated circuit to reduce leakage current and power consumption. The use of a charge pump may make it possible to produce a bias voltage of a magnitude or polarity that might otherwise be difficult to supply using an external pin.

Charge pumps use oscillators to produce a charge pump clock signal. The charge pump clock signal is applied to each of the stages of the charge pump. When the clock signal in a charge pump is active, the charge pump will produce its desired output voltage at an output terminal.

In circuits in which a voltage of a particular value is needed, charge pump circuits may be regulated using feedback. For example, a comparator may compare the output voltage on the output terminal of the charge pump to a reference voltage. The oscillator for the charge pump can be turned on and off in response to the output of the comparator as needed to adjust the output voltage.

To provide sufficient current handling capability, a typical integrated circuit may have a number of charge pumps whose outputs are connected in parallel. The charge pumps may be distributed around the integrated circuit so that the output voltage can be delivered where needed. A charge pump circuit that is formed from multiple smaller charge pumps in this way will be able to operate properly under a variety of load conditions.

The number of charge pumps that are connected in parallel in a given design is based on a worst-case scenario. A designer takes into account the worst possible set of manufacturing and operating variables (e.g., temperature, oxide thickness variations, etc.). Based on this worst-case scenario, the designer determines how many charge pumps should be included in the charge pump circuit. To ensure proper operation under all conditions, the charge pump circuitry tends to be over-designed (i.e., there are more charge pumps in the circuit than are necessary in most normal operating situations).

While over-designing charge pump circuitry in this way ensures that the charge pump circuitry will have sufficient capacity to handle its load, the inclusion of multiple charge pumps that operate in parallel can lead to ripple. This is because conventional charge pump circuits that include multiple charge pumps connected in parallel turn all of the charge pumps off and on at the same time. Excessive ripple gives rise to undesired noise that can adversely affect device performance.

It would therefore be desirable to be able to provide improved charge pump circuitry for use on integrated circuits.

SUMMARY

A charge pump circuit may have multiple charge pumps. For example, a charge pump circuit may be provided with a master charge pump and multiple slave charge pumps. The master charge pump may have an output. Each slave charge pump may also have an output. The outputs of the master and slave charge pumps may be connected to a common node that serves as the output terminal for the charge pump circuit.

A charge pump regulator circuit may be associated with the master charge pump. The charge pump regulator circuit may monitor the output voltage on the output terminal and may generate a corresponding control signal. The control signal may be provided to a chain of registers and associated logic gates.

When the charge pump regulator circuit determines that the charge pump resources of the charge pump circuit should be enabled, the registers and logic gates may produce a sequential set of slave charge pump enable signals in response to the control signal. The slave charge pump enable signals may be used to sequentially enable the charge pumps to progressively increase the strength of the charge pump.

To allow the charge pumps to be rapidly disabled when a target voltage level is reached, each charge pump may be provided with a local charge pump regulator circuit. Each local charge pump regulator circuit may have its own comparator that receives feedback from the output terminal. When a local charge pump regulator circuit determines that its associated charge pump should be disabled, that charge pump may be turned off without waiting for a global control signal from the charge pump regulator circuit that is associated with the master charge pump.

Further features of the invention, its nature and various advantages will be more apparent from the accompanying drawings and the following detailed description of the preferred embodiments.

BRIEF DESCRIPTION OF THE DRAWINGS

FIG. 3 is a table showing how the charge pump circuits of FIG. 2 may be turned on in sequence in accordance with an embodiment of the present invention.

DETAILED DESCRIPTION

Figure 1:
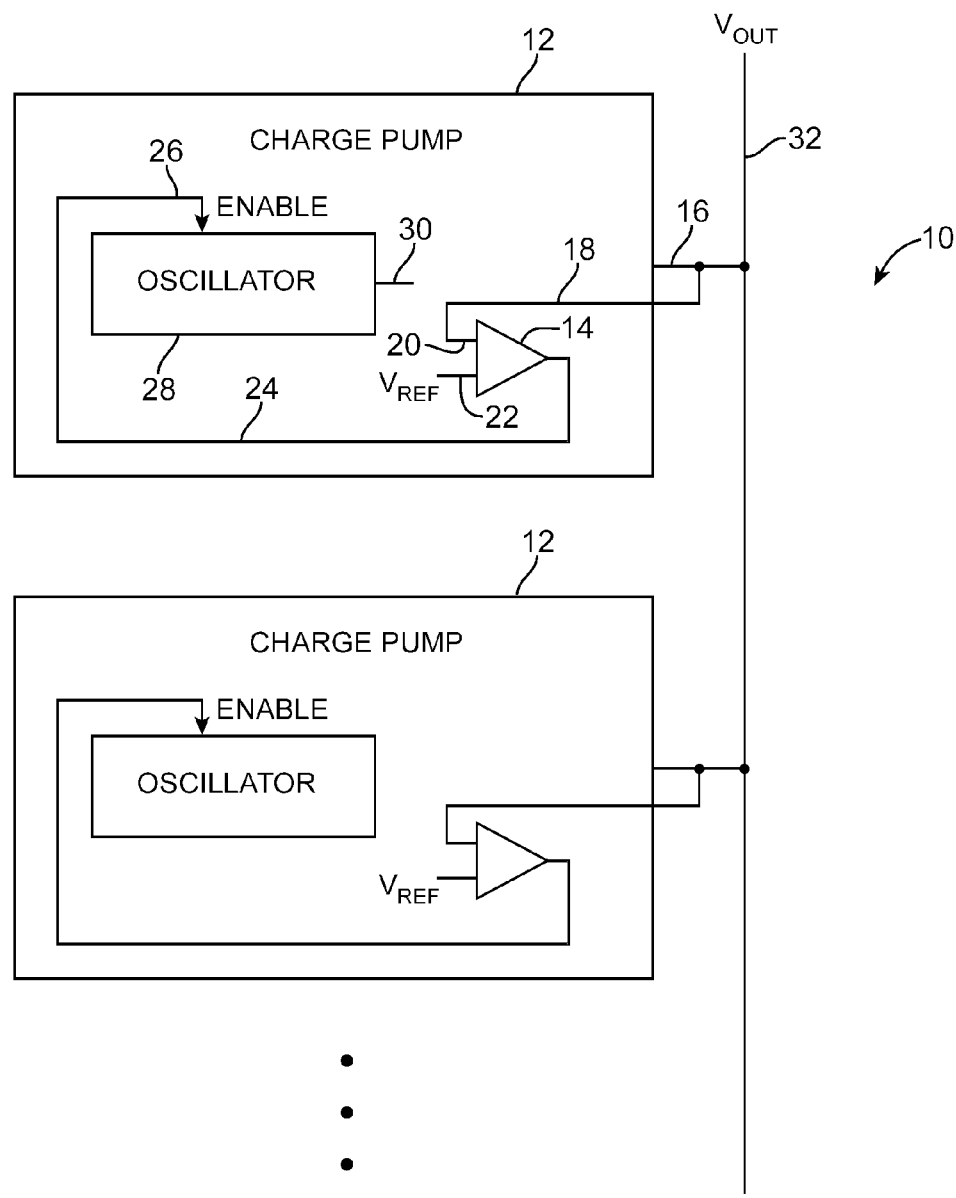
FIG. 1 is a diagram of a conventional charge pump circuit having multiple charge pumps with outputs that are connected in parallel.

A conventional charge pump circuit of the type that has been used to produce a negative body bias voltage for p-type bodies in n-channel metal-oxide-semiconductor (NMOS) transistors on programmable logic device integrated circuits is shown in FIG. 1. As shown in FIG. 1, charge pump circuit 10 contains multiple individual charge pump circuits 12. These circuits are distributed around a central logic region and have all of their outputs 16 tied to a common power supply voltage line 32 (i.e., the p-well reverse bias line).

Each charge pump has an oscillator 28 that produces clock pulses at a corresponding output 30. The clock pulses at each output 30 are provided to nodes in a chain of charge pump stages each of which has a capacitor and a diode. The oscillator is controlled by an enable signal ENABLE that is supplied to control input 26. The signal ENABLE is a digital signal and is either at a logic "1" value (i.e., ENABLE is high) or is at a logic "0" value (i.e., ENABLE is low). When the value of ENABLE is high, oscillator 28 is on and produces clock pulses on output 30. When the value of ENABLE is low, oscillator 28 is off and no clock pulses are produced on the oscillator output.

When oscillator 28 is on, the presence of the clock pulses on oscillator output 30 causes the output voltage VOUT on output 16 to be driven downwards towards a desired negative voltage bias level (in this example in which charge pump 10 is a negative charge pump). When oscillator 28 is off, the magnitude of output VOUT drifts high. A feedback mechanism is used to regulate the magnitude of the voltage VOUT that is maintained on power supply line 32.

In particular, each charge pump circuit has a feedback path 18 that feeds back voltage VOUT from line 32 to input 20 of comparator 14. The other input of comparator (input 22) receives a reference voltage VREF from a bandgap voltage reference circuit. Comparator 14 compares the voltages on its two inputs and produces a corresponding digital output signal on its output. This digital output signal is routed to control input 26 of oscillator 28 and serves as the enable signal ENABLE.

During operation, the voltage on line 32 may fluctuate. If the voltage rises above VREF, the output of comparator 14 (signal ENABLE) will go high, turning on oscillator 28 and driving the voltage on output line 16 low to compensate (assuming, for this example, that charge pump 12 is a negative charge pump). If the voltage falls below VREF, comparator 14 will take ENABLE low, turning on oscillator 28 and allowing VOUT on line 32 to rise.

Each separate charge pump 12 has the same feedback circuit, so each charge pump 12 responds in the same way to the voltage fluctuations on line 32. For example, if the voltage on line 32 rises slightly above its desired target level, all charge pumps 12 in circuit 10 will sense this rise at the same time and will therefore all turn on simultaneously. Particularly when circuit 10 is designed conservatively and contains numerous charge pumps 12, the simultaneous response of all of the charge pumps 12 to a detected voltage fluctuation can cause an overly aggressive response. This response gives rise to ripple noise.

Figure 2:
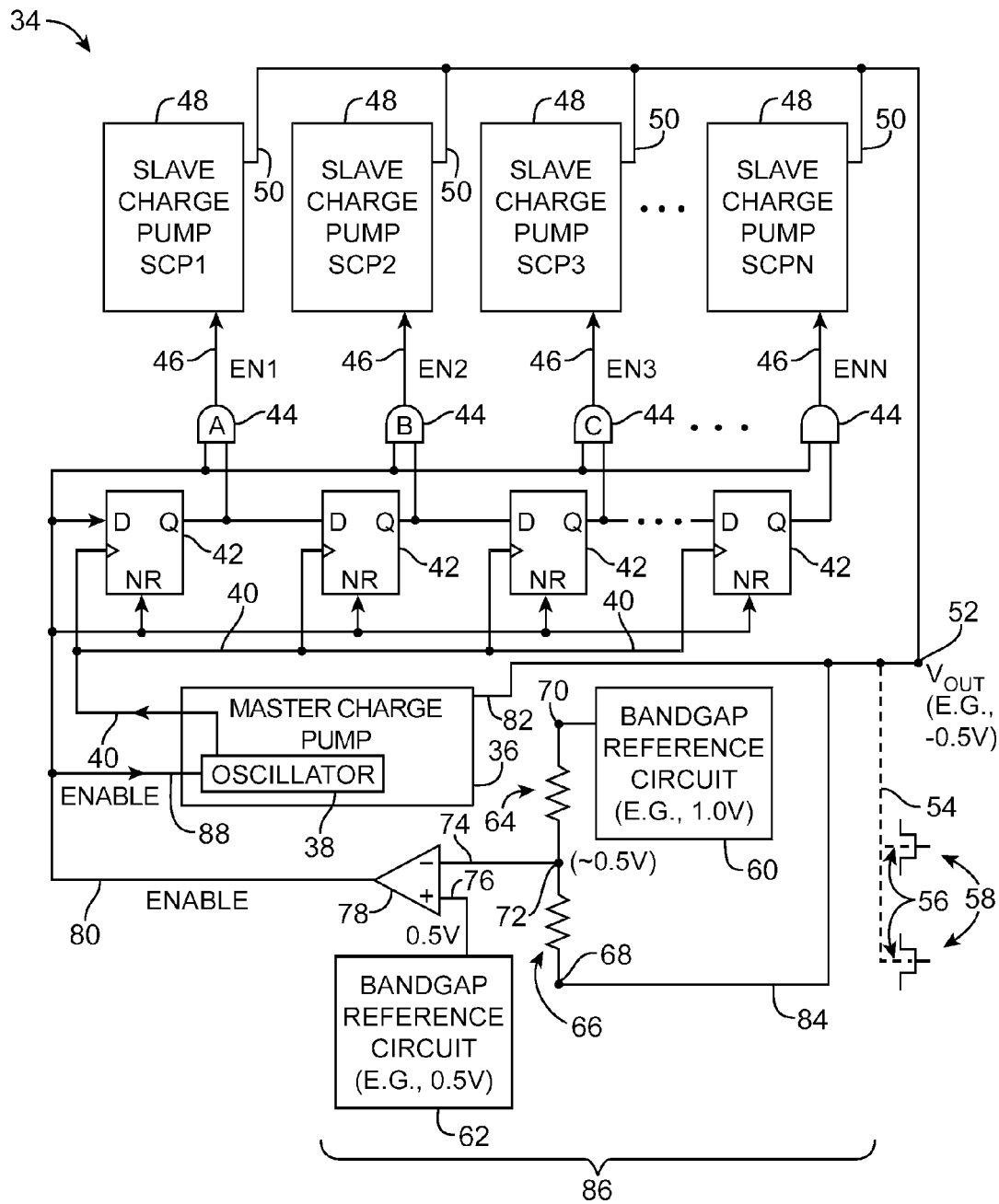
FIG. 2 is a circuit diagram of an illustrative charge pump circuit in accordance with an embodiment of the present invention.

A charge pump circuit in accordance with an embodiment of the present invention is shown in FIG. 2. As shown in FIG. 2, charge pump circuit 34 has a master charge pump 36 with an oscillator 38. Oscillator 38 produces a clock signal on path 40 that is distributed to register circuitry 42. Register circuitry 42 is configured to form a chain of registers. The register chain and logic gate circuitry 44 are used to sequentially enable slave charge pumps 48. This arrangement allows the charge pump resources of charge pump circuit 34 to be turned on in a progressive fashion. Because the charge pumps are not all turned on simultaneously as with the conventional arrangement of FIG. 1, the response of charge pump circuit 34 is more gradual and less likely to produce ripple.

There may, in general, be any suitable number of charge pumps in charge pump circuit 34. There may, for example, be one master charge pump 36 and one, two, three, four, or more than four slave charge pumps 48. A typical integrated circuit might have 5-15 charge pumps (as an example). Other numbers of charge pumps may be used if desired.

The clock on path 40 may be applied to the charge pump stages in master charge pump 36. This causes master charge pump 36 to produce a corresponding output voltage on output 82. The clock signal that is produced by oscillator 38 is also routed to the clock input of each of registers 42 using clock distribution path 40. Slave charge pumps 48 receive enable signal EN1, EN2, EN3, . . . ENN on inputs 46 from the Q outputs of the registers 44 (e.g., D-Q flip-flops) after passing through the gating logic circuitry that is interposed between the Q outputs of registers 42 and charge pump inputs 46 (e.g., after passing through AND gates 44). There is a register 42 and AND gate 44 associated with each slave charge pump 48. When the register output associated with a given slave charge pump is high and the AND gate that is associated with that register permits the enable signal to pass to the given slave charge pump, that slave charge pump will be enabled.

Each slave charge pump 48 has a corresponding output 50. When an asserted enable signal is received by a slave charge pump at its input 46, the oscillator in that slave charge pump will be enabled and the charge pump stages in that slave charge pump will respond by producing an output voltage on output 50.

As shown in FIG. 2, the output voltage from master charge pump 36 on output 82 is routed to charge pump circuit output terminal 52. The output 50 of each slave charge pump 48 is also connected to charge pump circuit output 52.

The voltage VOUT on output terminal 52 of charge pump circuit 34 may be used in any suitable circuit application. In the example of FIG. 2, voltage VOUT is used as a body bias voltage and is distributed to body terminals 56 of n-channel metal-oxide-semiconductor transistors 58 over body bias distribution path 54. Transistors 58 may be programmable logic transistors on a programmable logic device integrated circuit (as an example). This is, however, merely illustrative. Voltage VOUT may be used by any suitable circuitry on an integrated circuit.

The magnitude of voltage VOUT that is produced by charge pump circuit 34 can be regulated using feedback. Feedback path 84 may be used to route voltage VOUT to node 68 of charge pump regulation circuit 86. Reference voltages for circuit 86 may be supplied by respective voltage reference sources. With the illustrative arrangement of FIG. 2, a first voltage reference (e.g., a 1.0 volt reference voltage) may be applied to node 70 by first bandgap reference circuit 60 and a second voltage reference (e.g., a 0.5 volt reference voltage) may be applied to input 76 of comparator 78 by second bandgap reference circuit 62. Resistors 64 and 66 form a voltage divider circuit that scales the voltage VOUT on terminal 52 so that when VOUT is at its desired level (e.g., –0.5 volts), the voltage on node 72 will be equal to the output of circuit 62 (i.e., 0.5 volts in this example).

The voltage on node 72 is routed to input 74 of comparator 78. Comparator 78 compares the voltage on node 72 (which is representative of a measurement of output voltage VOUT on output node 52) to the reference voltage produced by circuit 62 on input 76 and produces a corresponding control signal such as the enable signal ENABLE on output 80.

The ENABLE signal on path 80 is routed to the enable input 88 of oscillator 38. If the voltage level on node 52 becomes too low (in the FIG. 2 negative charge pump example), ENABLE will be deasserted (by taking ENABLE to a logic low value) by comparator 78 and operation of oscillator 38 will be inhibited. When ENABLE is low, complementary reset signals NR for registers 42 are low, so registers 42 are all reset (i.e., cleared so that their outputs Q are low). This will turn the charge pumps of circuit 34 off and will allow VOUT to rise. If the voltage level on node 52 becomes too high, comparator 78 will assert signal ENABLE (by taking ENABLE to a logic high value). The high ENABLE signal will make complementary reset signals NR high, so register clearing operations will be inhibited.

Positive charge pump configurations may be used for charge pump circuit 34 if desired, in which case the signal polarities may be reversed accordingly.

When ENABLE goes high, oscillator 38 will be enabled and master charge pump 36 will be enabled. However, slave charge pumps 48 will not be immediately enabled. Rather, at each successive clock cycle, an additional one of slave charge pumps 48 will be turned on. As a result of this staggered approach, the capacity of charge pump circuit 34 is progressively increased in response to a feedback signal indicating a need for the charge pump circuitry to turn on. Unlike conventional arrangements in which all of the individual charge pumps are synchronized and generate ripple, charge pump circuitry 34 of FIG. 2 turns on charge pumps 48 in a sequence as the enable signal passes through each of the registers in the chain of registers 42.

Each register 42 receives the clock signal output of oscillator 38 on its clock input. Each register 42 also receives a version of signal ENABLE. The first register in the chain of registers (i.e., the register associated with slave charge pump SCP1), receives ENABLE directly from path 80. The second register in the chain of registers (i.e., the register in the chain of registers that is associated with slave charge pump SCP2), receives the ENABLE signal through the first register (i.e., the D input of the second register is connected to the Q output of the first register). This chain arrangement is used for all registers 42.

The first input of each AND gate 44 receives the signal ENABLE directly from ENABLE path 80. Each register 42 provides its output Q to a second one of the two inputs of its associated AND gate 44. For example, the output Q of the first register 42 is applied to one of the two inputs to AND gate A, the output of the second register 42 is applied to one of the two inputs to AND gate B, the output of the third register 42 is applied to one of the two inputs of AND gate C, and so forth. Although the gating logic in this example uses AND gates, any suitable logic gates may be used for performing logic gating functions (e.g., NAND gates, NOR gates, OR gates, etc.). The use of AND gates 44 is merely illustrative.

Each AND gate 44 produces a high output only when both of its inputs are high. Initially, when ENABLE is asserted by comparator 78, the AND gate input that receives its signal from the Q output of an associated register 42 will be low. The outputs of all of AND gates 44 will therefore initially be low. With each successive clock cycle, however, the high ENABLE signal will be clocked through an additional register in the register chain. As each register provides a high Q output, its associated AND gate will produce a high output (i.e., a high enable signal EN), because the other input to that AND gate (the ENABLE signal on line 80) is already high. With this arrangement, the enable signals EN1, EN2, EN3, . . . ENN will turn on in sequence.

The table of FIG. 3 shows how the charge pumps of charge pump circuit 34 are turned on in sequence when enable signal ENABLE goes high. Initially (e.g., at clock cycle 1), master charge pump circuit 36 will be enabled, as indicated by the entry in the last column of the first row of the FIG. 3 table. At clock cycle 2, the output of the first register 42 and ENABLE will be high, so signal EN1 will be high, turning on slave charge pump SCP1. Progressively more slave charge pumps 48 are turned on at each successive clock cycle of oscillator 38, as the high ENABLE signal is clocked through the chain of registers 42.

Figure 4:
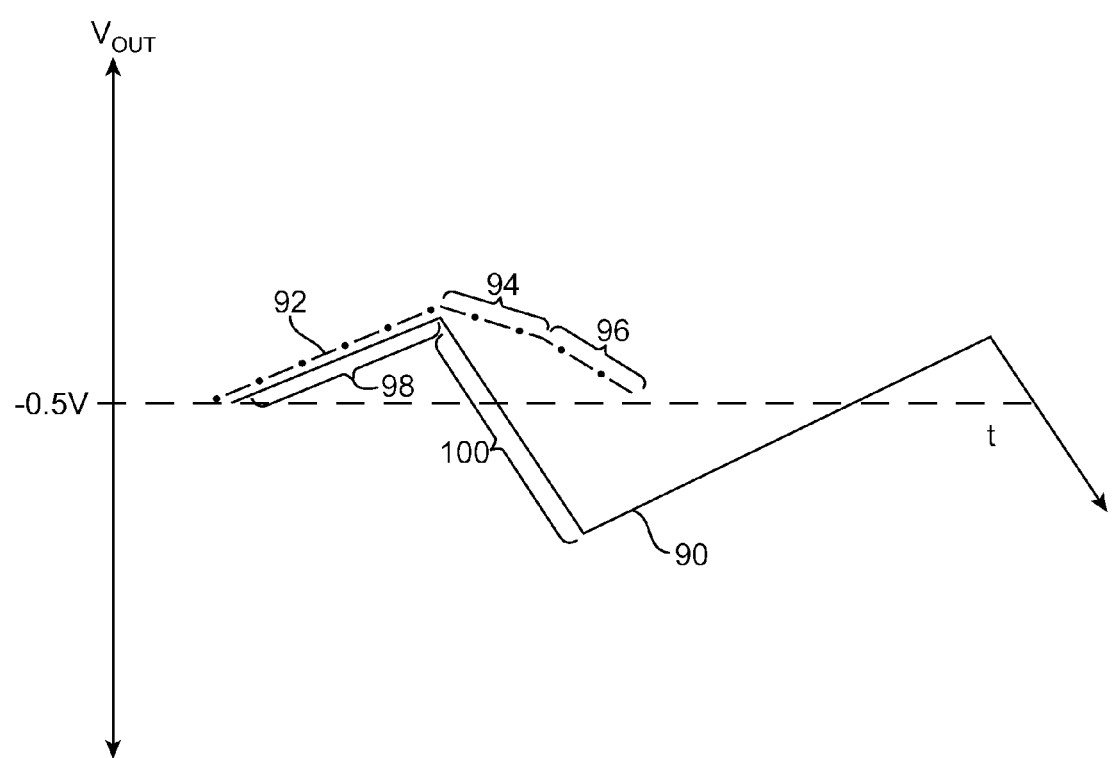
FIG. 4 is a graph comparing the output voltage produced by a conventional charge pump circuit to the output voltage produced by a charge pump circuit with a staggered turn-on feature in accordance with an embodiment of the present invention.

The impact of the sequential charge pump enablement scheme is shown in the graph of FIG. 4. In the graph of FIG. 4, output voltage VOUT is plotted as a function of time t. Solid line 90 represents the behavior of conventional charge pump circuit 10. Dashed-and-dotted line 92 represents the behavior of a charge pump circuit with sequential enablement capabilities of the type described in connection with FIG. 2.

As shown by line 90, when the feedback circuitry of conventional circuit 10 determines VOUT has drifted high, all of the charge pumps 12 in circuit 10 will be simultaneously turned on. This leads to a steep drop in output voltage VOUT, as represented by line segment 100.

In contrast, charge pump circuit 34 turns on charge pump resources in a sequential fashion. When the charge pumps are off, voltage VOUT will drift high, as indicated by line segment 98. When the feedback circuitry of charge pump regulator circuit 86 detects that VOUT has drifted high, comparator 78 will assert the ENABLE signal on path 80. This will turn on master charge pump 36 and will cause voltage VOUT to begin dropping. After a clock cycle, slave charge pump signal EN1 will go high and a first of the slave charge pumps will also be turned on. As shown in FIG. 4, when only master charge pump circuit 36 is on, voltage VOUT will drop at a relatively slow rate, as indicated by gradually sloped line segment 94. When both the master charge pump and the first slave charge pump are turned on, the rate of decrease of voltage VOUT will increase, as indicated by more steeply sloped line segment 96. With each clock cycle, an additional slave charge pump is turned on, so the full strength of the charge pump circuitry of FIG. 2 will eventually be switched into use. However, because each slave charge pump is turned on in sequence, the sharp drop in output voltage VOUT that was produced with the conventional charge pump circuit will be avoided. Charge pump circuit 34 will therefore exhibit reduced ripple relative to conventional circuit 10.

If desired, local charge pump regulator circuits may be used to produce local versions of the enable signal. These local versions of the enable signal may be used to turn off each slave charge pump rapidly as soon as it is determined that the voltage VOUT has reached its desired level. This avoids the need for the slave charge pumps to await the arrival of a global control signal from the charge pump regulator circuit that is associated with the master charge pump. There may be non-negligible delays associated with distributing control signals from the master charge pump regulator circuit to the slave charge pump circuits (e.g., due to parasitic capacitances, delays associated with passing control signals through buffer circuits, etc.). These delays can be tolerated when sequentially turning on the slave charge pumps, because any delay in the control signal will simply result in a slower (less drastic) turn on characteristic. However, delays that are incurred when disabling the charge pumps can give rise to excessive ripple, because these delays can prevent the strength of the charge pump circuit from being reduced as fast as desired.

Figure 5:
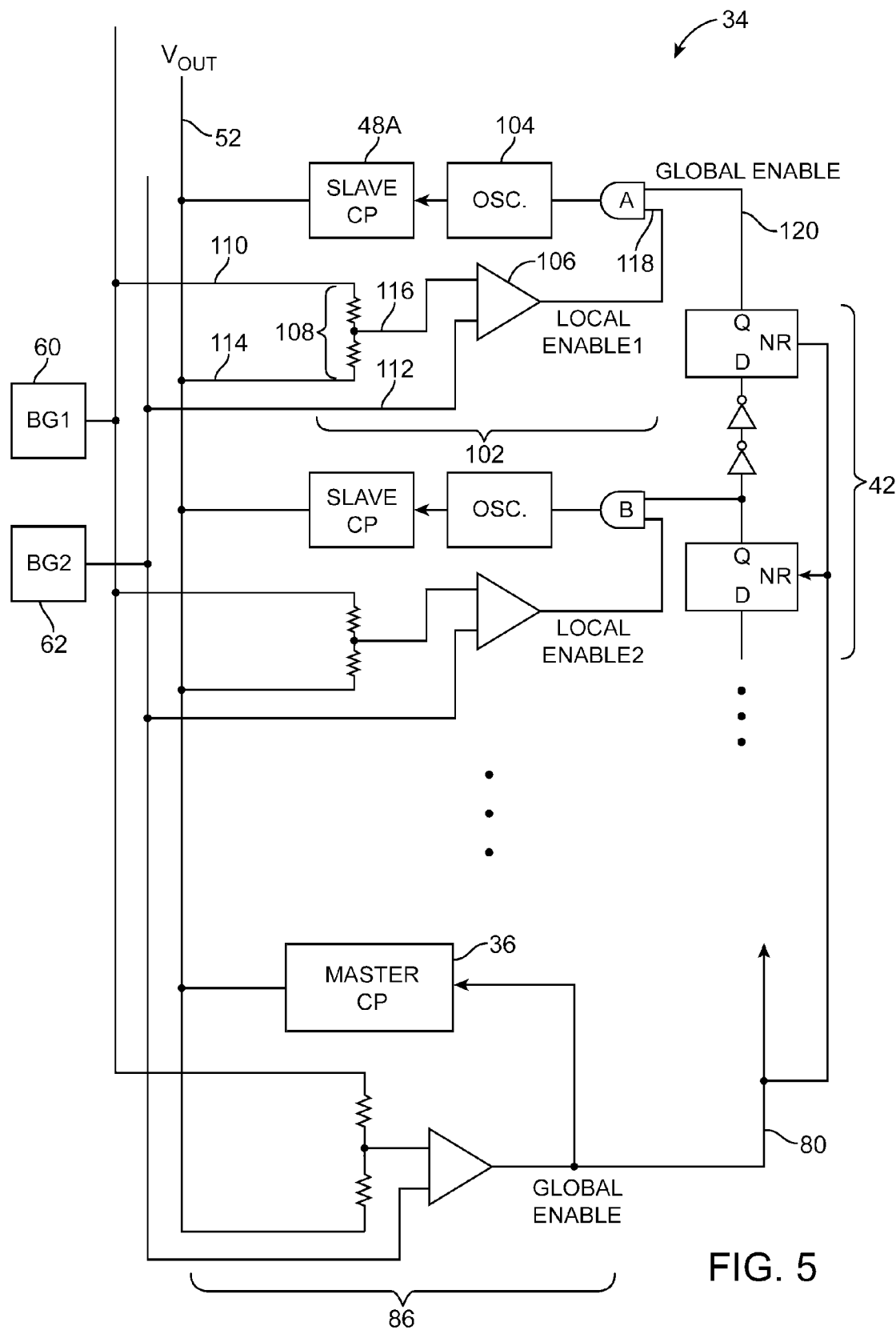
FIG. 5 is a circuit diagram of another illustrative charge pump circuit in accordance with an embodiment of the present invention.

An illustrative arrangement that may be used to provide charge pump circuit 34 with local charge pump turn-off capabilities is shown in FIG. 5. As shown in FIG. 5, each slave charge pump may have an associated local charge pump regulator circuit such as local charge pump regulator circuit 102 of charge pump 48A. Circuit 102 may use line 114 to receive feedback on the magnitude of voltage VOUT on charge pump circuit output 52 (as with master charge pump regulator circuit 86).

Circuit 102 may have a comparator 106. Comparator 106 may have one input connected to line 112 and another input connected to line 116. Line 112 may receive a reference voltage from voltage reference circuit 62 (e.g., a bandgap reference). Line 116 may receive a voltage that serves as a feedback signal from output voltage VOUT. In particular, line 116 may receive a voltage from voltage divider 108. Voltage divider 108 may have one terminal that is connected to fixed voltage reference source 60 (e.g., a bandgap reference) and another terminal that is connected to output 52. The intermediate node in the voltage divider to which line 116 is connected therefore is responsive to fluctuations in voltage VOUT.

Each slave charge pump has an associated oscillator. For example, slave charge pump 48A is provided with a clock signal from oscillator 104. The operation of oscillator 104 is controlled by the output of AND gate A. If the output of gate A is high, oscillator 104 is turned on and slave charge pump 48A will help the other active charge pumps in pulling the voltage VOUT low on output node 52. Once the voltage VOUT reaches its intended target, all of the charge pumps should turn off rapidly to prevent over-shoot (i.e., to prevent VOUT from dropping too far beneath its target voltage, which would lead to undesirable ripple).

A rapid turn off of the slave charge pump can be achieved using the local charge pump regulator circuits of FIG. 5. Each local charge pump regulator circuit provides a local enable signal (e.g., LOCAL ENABLE1 for slave charge pump 48A) based on the locally gathered feedback value of VOUT that was obtained using line 116. If it is determined locally that VOUT has fallen past its intended lower limit, local comparator 106 will deassert LOCAL ENABLE1 on input 118 of corresponding AND gate A (i.e., LOCAL ENABLE1 will go low). This will make the output of the AND gate (i.e., the output of AND gate A for slave charge pump 48A in the example of FIG. 5) go low immediately, without waiting for a deasserted global control signal GLOBAL ENABLE on input 120 of the AND gate to be received from path 80 at the output of master charge pump regulator circuit 86. The use of local feedback arrangements of the type shown in FIG. 5 thereby helps circuit 34 turn off its charge pumps rapidly under the control of local control signals produced by local charge pump feedback circuits such as circuit 102, even if the global control signal distribution path between the output of master charge pump regulator circuit 86 and the slave charge pumps includes sources of delay.

Figure 6:
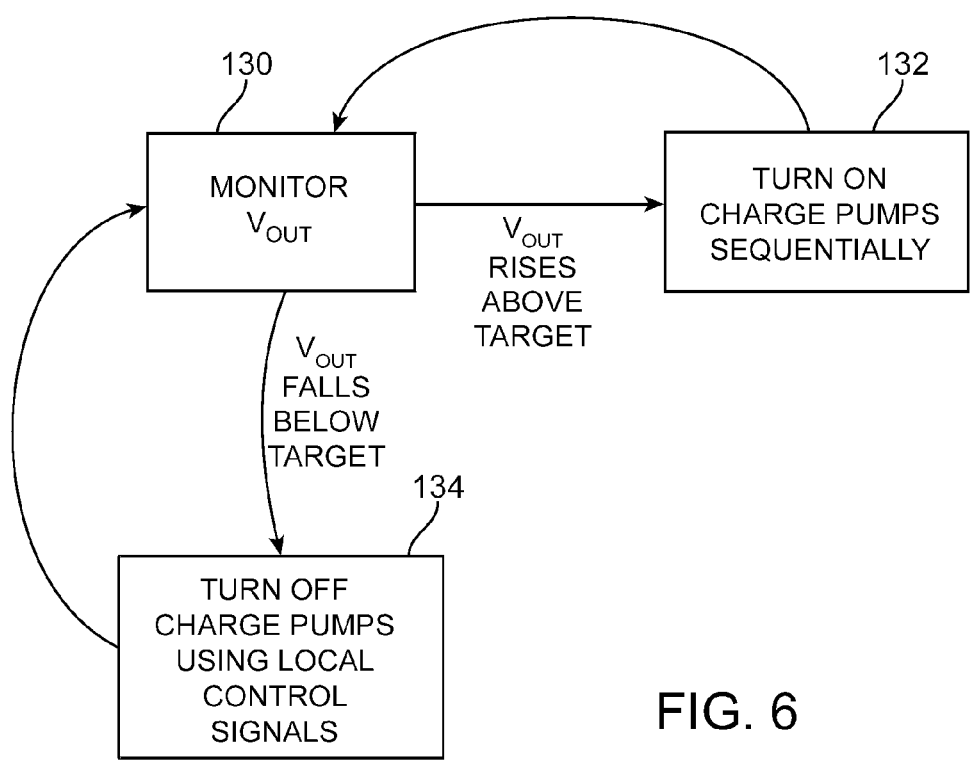
FIG. 6 is a diagram showing illustrative operations involved in maintaining a desired charge pump circuit output voltage using a charge pump circuit with multiple charge pumps in accordance with an embodiment of the present invention.

Illustrative operations involved in operating a charge pump circuit such as charge pump circuit 34 of FIG. 5 are shown in FIG. 6. During operation of charge pump circuit 34, master charge pump regulation circuit 86 and each of the local charge pump regulation circuits 102 monitor the output voltage Vout of charge pump circuit 34 on output terminal 52 (monitoring operation 130). When the charge pumps are off, the current drain on Vout (e.g., from the transistor body terminals or other load on the integrated circuit that is receiving Vout) tends to cause Vout to drift from its target value. If, for example, the charge pump circuit is a negative charge pump and the target value of Vout is negative (e.g., −0.5 volts), the voltage Vout will tend to drift higher when the charge pumps are off. When this upwards drift of Vout is detected by the feedback circuitry of the charge pump regulators, the charge pumps are turned on sequentially using the chain of registers in the charge pump circuit (sequential turn on operations 132). Once the value of Vout is measured to be less than the target value (e.g., less than −0.5 volts in this example), the local feedback from each of the slave charge pump regulator circuits turns off its associated slave charge pump oscillator without delay (turn off operations 134). The operations of FIG. 6 may be performed continuously, so long as the integrated circuit in which the charge pump circuit 34 is implemented continues to be powered.

The foregoing is merely illustrative of the principles of this invention and various modifications can be made by those skilled in the art without departing from the scope and spirit of the invention.

What is claimed is:

1. A charge pump circuit, comprising:
   a charge pump circuit output operable to output an output voltage;
   a plurality of charge pumps each having a respective charge pump output coupled to the charge pump circuit output; and
   circuitry operable to turn on charge pumps of the plurality of charge pumps sequentially in response to feedback associated with the output voltage, wherein each charge pump in the plurality of charge pumps has:
     a respective local charge pump regulator circuit that includes a comparator and that is operable to receive a local feedback signal based on the output voltage; and
     an associated oscillator that is controllable by an associated logic gate that comprises a first input operable to receive an output from the comparator in the respective local charge pump regulator circuit and comprises a second input that is operable to receive a global enable signal.

2. The charge pump circuit defined in claim 1 wherein the circuitry operable to turn on the charge pumps of the plurality of charge pumps sequentially includes a chain of registers.

3. The charge pump circuit defined in claim 2 wherein the second input for each associated logic gate is coupled to an output of a register in the chain of registers that corresponds to the associated logic gate.

4. The charge pump circuit defined in claim 1 wherein the plurality of charge pumps includes a master charge pump and a plurality of slave charge pumps.

5. The charge pump circuit defined in claim 4 wherein the respective local charge pump regulator circuit associated with the master charge pump is a master charge pump regulator circuit that is operable to produce the global enable signal in response to the feedback.

6. The charge pump circuit defined in claim 5 wherein the comparator of the master charge pump regulator circuit is operable to produce the global enable signal.

7. The charge pump circuit defined in claim 6 further comprising a voltage reference circuit operable to produce a reference voltage, wherein the comparator of the master charge pump regulator circuit comprises at least one input operable to receive the reference voltage.

8. The charge pump circuit defined in claim 7 wherein the circuitry operable to turn on the charge pumps of the plurality of charge pumps sequentially includes a chain of registers, the charge pump circuit further comprising a line operable to convey the global enable signal from the comparator of the master charge pump regulator circuit to the chain of registers.

9. A charge pump circuit, comprising:
   a master charge pump; and
   a plurality of slave charge pumps, wherein the master charge pump has a master charge pump output and wherein each of the slave charge pumps has an output that is coupled to the master charge pump output, wherein the master charge pump has a master charge pump regulator circuit operable to provide a control signal that controls the slave charge pumps, wherein each slave charge pump comprises an associated regulator circuit that comprises a comparator, wherein each of the comparators has a first input operable to receive a feedback signal from the master charge pump output and has a second input operable to receive a reference voltage, wherein the feedback signals are identical, wherein the reference voltages are identical, and wherein the regulator circuit associated with each slave charge pump is operable to produce a local control signal operable to locally disable that slave charge pump in response to the feedback signal from the master charge pump output received by that regulator circuit.

10. The charge pump circuit defined in claim 9 further comprising register circuitry operable to respond to the control signal and a clock signal to sequentially control the slave charge pumps.

11. The charge pump circuit defined in claim 10 wherein the register circuitry is operable to supply signals to respective logic gates, each logic gate being operable to produce an enable signal at its output that controls a respective one of the slave charge pumps.

12. A method for controlling charge pumps in a charge pump circuit that have outputs connected to a common output node that has an associated output voltage, comprising:
 with a charge pump regulator circuit, generating a control signal using a feedback signal based on the output voltage; and
 at least partly based on the control signal, sequentially enabling the charge pumps, wherein sequentially enabling the charge pumps comprises producing sequentially asserted output signals from a chain of registers, each sequentially asserted output signal serving as an enable signal for an oscillator associated with a respective one of the charge pumps.

13. The charge pump circuit defined in claim 11 wherein each logic gate has a first input operable to receive one of the signals supplied by the register circuitry and has a second input operable to receive an output signal from a respective one of the comparators.

14. A charge pump circuit, comprising:
 a plurality of charge pumps having respective charge pump outputs coupled to a common output line, wherein each charge pump of the plurality of charge pumps is operable to produce an output voltage on the common output line;
 a plurality of local regulator circuits respectively associated with the plurality of charge pumps, wherein each local regulator circuit is operable to locally gather a feedback value of the output voltage, wherein the feedback values gathered by the local regulator circuits are substantially identical, wherein each local regulator circuit is further operable to produce a local control signal in response to a comparison of the feedback value to a common limit, and wherein the local control signal from each local regulator circuit is operable to turn off the charge pump associated with that local regulator circuit; and
 a regulator circuit operable to provide a control signal that controls each of the charge pumps of the plurality of charge pumps.

* * * * *